(12) United States Patent
Quadir et al.

(10) Patent No.: US 9,040,440 B2
(45) Date of Patent: May 26, 2015

(54) METHOD OF TOUGHENING ALUMINA

(71) Applicant: Superior Technical Ceramics Corporation, St. Albans, VT (US)

(72) Inventors: Tariq Quadir, Colchester, VT (US); Brian H. Gold, Swanton, VT (US)

(73) Assignee: Superior Technical Ceramics Corporation, St. Albans, VT (US)

( * ) Notice: Subject to any disclaimer, the term of this patent is extended or adjusted under 35 U.S.C. 154(b) by 0 days.

(21) Appl. No.: 14/173,050

(22) Filed: Feb. 5, 2014

(65) Prior Publication Data
US 2014/0155248 A1 Jun. 5, 2014

Related U.S. Application Data

(62) Division of application No. 13/594,281, filed on Aug. 24, 2012, now Pat. No. 8,679,995.

(51) Int. Cl.
C04B 35/119 (2006.01)
C04B 35/64 (2006.01)

(52) U.S. Cl.
CPC ................ C04B 35/64 (2013.01); C04B 35/119 (2013.01); C04B 2235/3206 (2013.01); C04B 2235/3225 (2013.01); C04B 2235/3246 (2013.01); C04B 2235/77 (2013.01); C04B 2235/786 (2013.01); C04B 2235/96 (2013.01)

(58) Field of Classification Search
CPC .................. C04B 35/64; C04B 35/119; C04B 2235/3246; C04B 35/6261; C04B 35/62625; C04B 35/6264
See application file for complete search history.

(56) References Cited

U.S. PATENT DOCUMENTS

| | | | |
|---|---|---|---|
| 4,218,253 A | 8/1980 | Dworak et al. |
| 4,298,385 A | 11/1981 | Claussen et al. |
| 4,316,964 A | 2/1982 | Lange |
| 4,331,048 A | 5/1982 | Dworak et al. |
| 4,501,818 A | 2/1985 | Rossi |
| 4,532,224 A | 7/1985 | Hori |
| 4,751,207 A | 6/1988 | Manniing |
| 4,772,576 A | 9/1988 | Kimura et al. |
| 4,820,667 A | 4/1989 | Tsunekawa et al. |
| 4,900,701 A | 2/1990 | Morishita et al. |
| 4,952,536 A | 8/1990 | Block |
| 5,032,555 A | 7/1991 | Yanmanis et al. |
| 5,045,402 A | 9/1991 | Adams, Jr. et al. |
| 5,130,210 A | 7/1992 | Iwasaki et al. |
| RE34,028 E | 8/1992 | Manning |
| 5,155,071 A | 10/1992 | Jacobson |
| 5,312,789 A | 5/1994 | Wood |
| 5,419,827 A | 5/1995 | Nanataki et al. |
| 5,432,133 A | 7/1995 | Matsuo |
| 6,624,106 B2 | 9/2003 | Cohen |
| 6,800,158 B2 | 10/2004 | Polikarpus et al. |
| 7,012,036 B2 | 3/2006 | Nawa et al. |
| 7,148,167 B2 | 12/2006 | Shikata et al. |
| 8,012,897 B2 | 9/2011 | Cohen |
| 2006/0063661 A1 | 3/2006 | Cohen |

Primary Examiner — Karl Group
(74) Attorney, Agent, or Firm — Thomas G. Ference

(57) ABSTRACT

The present application is directed to a zirconia toughened alumina body and process for making the body. The process involves combining tetragonally stabilized $ZrO_2$ nanoparticles, $Mg(OH)_2$ particles and alumina powder into a mixture. All particles of the mixture are milled, formed into a green compact and then sintered. The final composition of the body includes $\alpha$-$Al_2O_3$ toughened with 0.5 to 2.5 weight percent $ZrO_2$ in a stabilized tetragonal form and 0.03 to 0.10 weight percent MgO. The composition results in an $Al_2O_3$ body with a density less than 4.0 g/cc and strength greater than 50 kpsi.

7 Claims, No Drawings

METHOD OF TOUGHENING ALUMINA

RELATED APPLICATIONS

This application is a division of U.S. patent application Ser. No. 13/594,281, filed Aug. 24, 2012, now U.S. Pat. No. 8,679, 995, which claims the benefit of priority of U.S. Provisional Patent Application No. 61/675,747, filed Jul. 25, 2012 entitled "Addition of Magnesium Oxide to Zirconia Toughened Alumina", both of which are incorporated herein by reference.

FIELD

This patent application generally relates to zirconia toughened alumina (ZTA). More specifically it relates to a composition and method of toughening alumina with stabilized zirconia and magnesium oxide.

BACKGROUND

Standard zirconia toughened alumina (ZTA) is produced in industry by taking alpha alumina ($\alpha$-$Al_2O_3$) and adding 10-25 percent by weight of tetragonal zirconia polycrystals (TZP) to strengthen and toughen the alumina as taught by Hori in U.S. Pat. No. 4,532,224. TZP is a tetragonal form of zirconia, this tetragonal crystal structure phase is a metastable form of the zirconia that is stabilized by a stabilizing agent so as not to revert back to the monoclinic crystal structure phase upon cooling from the sintering temperature. Common stabilizing agents are $Y_2O_3$ and $CeO_2$ that when combined with zirconia ($ZrO_2$) in an effective composition gives rise to TZP. Standard ZTA of 10-25 weight percent TZP has a theoretical density of 4.10-4.35 g/cc and strength of greater than 80 kpsi. Hori showed for compositions of TZP below 10-percent by weight that the strength of the alumina drops significantly to around 48 kpsi, near that of just pure alumina. However, pure alumina is much lighter with a theoretical density of around 3.98 g/cc.

Lighter weight formulations of ZTA with high strength have been difficult to produce. Lighter weight, stronger ZTA has applications in armor and wear-tiles for chimney chutes where lower density coupled with higher strength is required. It is the goal of the present patent application to provide a lighter weight and stronger formulation of ZTA.

SUMMARY

One aspect of the present patent application is directed to a ceramic, comprising 0.5 to 2.5 weight percent. $ZrO_2$ in the form of crystalline grains that are stabilized in a substantially tetragonal crystal structure, 0.03 to 0.10 weight percent MgO in the form of crystalline grains, and the remainder of the ceramic being substantially $\alpha$-$Al_2O_3$. The ceramic has an actual density of less than 4.0 g/cc. The ceramic has strength greater than 50 kpsi.

Another aspect of the present patent application is directed to a method of fabricating a ceramic, comprising the steps of providing (i) crystalline $Al_2O_3$ particles, (ii) 0.5-2.5 percent by weight of crystalline $ZrO_2$ particles less than 0.1-microns that are stabilized in substantially the tetragonal crystal structure, and (iii) 0.043-0.144 percent by weight crystalline $Mg(OH)_2$ particles. The method then involves combining and milling all particles to have a D50 diameter of less than 1-micron. The method further involves forming a green compact and sintering the green compact in a temperature range of 1637° C. to 1660° C.

DETAILED DESCRIPTION

A new formulation on of ZTA that is lighter in weight than standard ZTA (10-25 percent by weight $ZrO_2$), but that is stronger than non-toughened alumina has been formulated. Yittria tetragonal zirconia polycrystals (YTZP) has a theoretical density of around 6.1 g/cc and is much denser than pure $\alpha$-$Al_2O_3$ that has a theoretical density of around 3.98 g/cc, so incorporating less YTZP will make the material lighter. Standard ZTA of 25-percent by weight of YTZP has a theoretical density of 4.35 g/cc. The new material with about 1-to-2 percent by weight YTZP has an actual density of only 3.92-3.95 g/cc. Less than 2.5 weight percent YTZP keeps density of the final ceramic under 4.0 g/cc, while more than 0.5 weight percent YTZP helps add some strength to the ceramic. By itself the small amount of YTZP added to the $\alpha$-$Al_2O_3$, however, does not dramatically increase the strength of the alumina as the grain size of the alumina still grows during processing to grain sizes of 6-to-20 microns during high temperature processing of 1637° C.-1660° C. The large grain size equates to lower strength. MgO is known to be a grain growth inhibitor, however standard amounts of MgO (0.06-percent by weight) provided alone in vendor materials such as by PECHINEY® LSB 172 do not provide enough inhibition to limit grain growth to less than 6-microns. It was found that by adding small amounts (range of 0.03 to 0.05 weight percent) of MgO as $Mg(OH)_2$ particles, and further combining with low percentages of nano-YTZP the average. $Al_2O_3$ grain size can be kept less than 6-microns (specifically a D50 diameter of between 4.8 and 6.0-microns for the ceramic produced in EXAMPLES 1-3) during high-temperature processing and improve the material's strength. This new sintered composition of ZTA comprises 0.5 to 2.5 weight percent $ZrO_2$ in the form of crystalline grains that are stabilized in a substantially tetragonal crystal structure, 0.03 to 0.10 weight percent MgO in the form of crystalline grains, and the remainder of the ceramic being substantially $\alpha$-$Al_2O_3$. The ceramic has an actual density of less than 4.0 g/cc. The ceramic has an average $\alpha$-$Al_2O_3$ grain size less than 6-microns and strength greater than 50 kpsi.

$\alpha$-$Al_2O_3$ crystalline particles used in the preparation of the examples described below were PECHINEY® powders, specifically, PECHINEY® P172 SB03 that has no MgO and a D50 particle size of 0.5-microns and PECHINEY® P172 LSB that has 0.06 weight percent MgO and a D50 particle size of 0.50-microns. YTZP with a particle size of less than 0.1-microns (nanoparticle size) were used. These YTZP powders were purchased from ABSCO® and MEL® of England. The MgO added to control the grain growth was in the fully hydrated form as $Mg(OH)_2$. The fully hydrated MgO was prepared by milling MgO in dionized water at a concentration of 60-percent solids. The yield from the solids becomes 69-percent MgO on sintering. The slurry particle size was 0.5-1.0 microns, which upon calcination becomes less than 0.1-microns. Having the MgO fully hydrated provides for better composition control with yields of MgO that are more accurate. One or more organic binders in combination with water and a dispersant (ammonium polyacrylate by RT VANDERBUILT®) were mixed with all particles to form a slurry. The organic binders act as a binding agent that holds the mixture of particles together. During sintering, the organic binders burn off, leaving the shape of the body intact. Some examples of organic binders that may be used to form green compact include polyvinyl alcohol (PVA) and polyethylene glycol (PEG). Other binders include, but are not limited to, acrylic binders, gum and waxes.

General preparation of the new lightweight ZTA formulation is as follows. Measured amounts of $\alpha$-$Al_2O_3$ powder, YTZP powder, $Mg(OH)_2$ as a slurry, organic binders, dispersants and water are mixed together in a premix tank and then passed through a bead mill. After bead milling, the D50 of all particles in the slurry is milled to less than 1-micron. The resulting slurry is spray dried into granulated powder and then pressed into a green compact of a given shape. The green compact is heated to 350° C. to 600° C. as part of a binder burn out cycle. The green compact is then further heated to a sintering temperature of 1637° C. to 1660° C. for 4-hours. Shrinkage of approximately 18-22 percent is obtained after sintering. The composition ranges of the final lightweight, high-strength ZTA materials are listed in TABLE 1. Modulus of rupture was tested using an INSTRON® three point bend fixture.

TABLE 1

Lightweight, High-Strength ZTA-Final Composition Range

| Material | Percent by weight |
| --- | --- |
| $\alpha$-$Al_2O_3$ | 97.5-99.5 |
| $ZrO_2$ (stabilized) | 0.5-2.5 |
| MgO | 0.03-0.10 |

Examples of the aforementioned embodiments are described in these non-limitative following examples.

TABLE 2

Lightweight ZTA Formulations with MgO added as $Mg(OH)_2$ particles

| Material | Weight | Manufacturer |
| --- | --- | --- |
| P172 SB03 (without MgO) | 117.54 g | PECHINEY ® |
| Nano-YTZP | 0.0 g-2.4 g* | ABSCO ® |
| $Mg(OH)_2$ (as slurry) | 0.086 g-0.144 g* | |
| Dispersant | 1.5 g | RT VANDERBILT ® |
| Organic Binder I | 7.06 g | |
| Organic Binder II | 3.3 g | |
| Water | 39.6 g | |

*Defines range for EXAMPLES 1-5.

Example 1

A mixture of alumina powder with no vendor added MgO, 0.05-weight percent added MgO (added as 0.12% $Mg(OH)_2$ slurry), and 2.0-weight percent nano-YTZP was prepared according to the formulation in TABLE 2. P172 SB03 and $Mg(OH)_2$ were added first followed by nanoparticle YTZP to the water, binder and a dispersant. The slurry was premixed for 30-minutes and then passed through the bead mill once. The slurry was spray dried with the binder at 550-600 psi. The parts were pressed and sintered at 1637° C. to 1660° C. with a binder burnout cycle between 350° C.-600° C. A 3-point bend test showed strength of 55 kpsi. Actual density of the sintered ceramic was 3.94 g/cc. Grain size was D50 4.8-microns.

Example 2

Sample preparation was the same as EXAMPLE 2 above; however, 0.03-weight percent MgO was added as $Mg(OH)_2$ slurry. A 3-point bend test showed strength of 53 kpsi. Grain size was D50 5.4-microns.

Example 3

Sample preparation was the same as EXAMPLE 2 above; however, 1.0-weight percent nano-YTZP was added. A 3-point bend test showed strength of 48 kpsi. Grain size was D50 5.8-microns.

Example 4

Sample preparation was the same as EXAMPLE 2 above; however, no MgO was added. A 3-point bend test showed strength of 43 kpsi. Grain size was D50 6.1-microns.

Example 5

Sample preparation was the same as EXAMPLE 2 above; however, no nano-YTZP was added. A 3-point bend test showed strength of 44 kpsi. Grain size was D50 12.0-microns.

TABLE 3

Lightweight ZTA Formulations with Vendor Built-in MgO in Alumina Powder

| Material | Weight | Manufacturer |
| --- | --- | --- |
| P172 LSB (0.06% MgO) | 117.54 g | PECHINEY ® |
| Nano-YTZP | 0.0 g-2.4 g* | ABSCO ® |
| Dispersant | 1.5 g | RT VANDERBILT ® |
| Organic Binder I | 7.06 g | |
| Organic Binder II | 3.3 g | |
| Water | 39.6 g | |

*Defines range for EXAMPLES 6 and 7.

Example 6

A mixture of alumina powder with only the MgO added by the vendor and 2.0-weight percent nano-YTZP, but with no additional $Mg(OH)_2$, was prepared according to the formulation in TABLE 3. P172 LSB was added first followed by nano-YTZP to the water, binder and a dispersant. The slurry was premix for 30-minutes and then passed through the bead mill once. The slurry vas spray dried with the binder at 550-600 psi. The pans were pressed and sintered at 1637° C. to 1660° C. with a binder burnout cycle between 350° C.-600° C. A 3-point bend test showed strength of 44 kpsi. Actual density of the sintered ceramic was 3.94 g/cc. Average grain size was 7.7-microns.

Example 7

Sample preparation was the same as EXAMPLE 6 above; however, no nano-YTZP was added. A 3-point bend test showed strength of 44 kpsi. Actual density of the sintered ceramic was 3.90 g/cc. Grain size was 15-microns.

TABLE 4 compares the relative strengths, grain size and compositions of the aforementioned examples. EXAMPLES 5 and 7 are the base line where no nano-YTZP was added. EXAMPLE 5 had 0.05-weight percent MgO added as $Mg(OH)_2$. EXAMPLE 7 had built in MgO by the supplier. The modulus of rupture of both examples resulted in normal values one would expect for pure alumina composition. EXAMPLES 4 and 6 are the baseline where 2-weight percent nano-YTZP was added. EXAMPLE 4 had no MgO added. EXAMPLE 6 uses the P172 LSB that has built in MgO by the supplier. The addition of the nano-YTZP in the amount of 2-weight percent by itself, or in conjunction with the built in MgO by the supplier, does not effectively control the grain size and the strength is also similar to normal values one would expect from pure alumina. EXAMPLES 1-3 use both the addition of nano-YTZP and nano-MgO (supplied as $Mg(OH)_2$) to the plain alpha alumina powder EXAMPLES 1-3 show significant improvement in the strength of the ceramic and control of the grain size to less than 6-microns. Hence, adding nano-MgO as initial $Mg(OH)_2$, homogenizing the particles to a dispersion of D50 less than 1-micron and then sintering makes a big difference in strength. Comparing EXAMPLES 1 and 3, one sees that as more nano-YTZP is added the strength goes up. However, to keep the material light weight, under 4.0 g/cc, it is necessary to keep the percent of nano-YTZP low, preferably below 2.5-weight percent and more preferably below 2.0-weight percent. When the percentage of nano-YTZP is lower than 1.0-weight percent, the strength of the material starts to drop below 50 kpsi and defines a lower limit for the percentage of nano-YTZP used. Comparing EXAMPLES 2 and 4, one sees as the amount of MgO, added as $Mg(OH)_2$, drops from 0.03-weight percent to zero weight percent the strength also drops below 50 kspi and defines a lower limit for the percentage of MgO. If the MgO content is above the solid solubility limit of MgO in $Al_2O_3$, the material will react to form spinel ($MgAl_2O_4$), which may be detrimental to mechanical properties of the material. Therefore the upper limit of MgO should be below approximately 0.10-weight percent MgO and preferably below 0.05-weight percent.

TABLE 4

Material Properties Summary vs. Composition

| Example | Strength (kpsi) | D50 Grain Size (μm) | YTZP % | MgO % |
|---|---|---|---|---|
| EXAMPLE 1 | 55 | 4.8 | 2.0 | 0.05 added as $Mg(OH)_2$ |
| EXAMPLE 2 | 53 | 5.4 | 2.0 | 0.03 added as $Mg(OH)_2$ |
| EXAMPLE 3 | 48 | 5.8 | 1.0 | 0.05 added as $Mg(OH)_2$ |
| EXAMPLE 4 | 43 | 6.1 | 2.0 | None |
| EXAMPLE 5 | 44 | 12.0 | None | 0.05 added as $Mg(OH)_2$ |
| EXAMPLE 6 | 44 | 7.7 | 2.0 | 0.06 built-in by vendor |
| EXAMPLE 7 | 44 | 15 | None | 0.06 built-in by vendor |

While several embodiments of the invention, together with modifications thereof, have been described in detail herein and illustrated by the accompanying examples, it will be evident that various compositions and further modifications are possible without departing from the scope of the invention. Nothing in the above specification is intended to limit the invention more narrowly than the appended claims. The examples given are intended only to be illustrative rather than exclusive.

What is claimed is:

1. A method of fabricating a ceramic, comprising the steps of:
    a) providing (i) crystalline $\alpha$-$Al_2O_3$ particles, (ii) 0.5-2.5 percent by weight crystalline $ZrO_2$ particles less than 0.1-microns and stabilized substantially in the tetragonal crystal structure, and (iii) 0.03-0.10 percent MgO by weight as $Mg(OH)_2$ particles;
    b) combining and milling all particles;
    c) forming a green compact; and
    d) sintering said green compact in a temperature range of 1637° C.-1660° C.

2. A method as recited in claim 1, wherein during said providing step a) said percent by weight crystalline $ZrO_2$ particles is 1.0-2.0.

3. A method as recited in claim 1, wherein during said providing step a) said percent MgO by weight is 0.03-0.05.

4. A method as recited in claim 1, wherein during said milling of step b) all particles are milled to have a D50 diameter of less than 1.0-micron.

5. A method as recited in claim 1, wherein said ceramic has a final actual density of less than 4.0 g/cc.

6. A method as recited in claim 1, wherein said ceramic has a final strength greater than 50 kpsi.

7. A method as recited in claim 1, wherein said tetragonal crystal structure of $ZrO_2$ is stabilized with a stabilizing agent that is at least one selected from the group consisting of $Y_2O_3$ and $CeO_2$.

* * * * *